United States Patent [19]
Heckmann et al.

[11] Patent Number: 6,076,705
[45] Date of Patent: Jun. 20, 2000

[54] HEATED FOLLOWER PLATE

[75] Inventors: Rudolf A. Heckmann, Highland, Mich.; Peter M. White, Columbia Heights, Minn.

[73] Assignee: Graco Inc., Minneapolis, Minn.

[21] Appl. No.: 09/151,263

[22] Filed: Sep. 11, 1998

Related U.S. Application Data

[60] Provisional application No. 60/058,829, Sep. 15, 1997.

[51] Int. Cl.⁷ .................................. B67D 5/62; H05B 3/06
[52] U.S. Cl. ........................................ 222/146.5; 219/540
[58] Field of Search ............................. 222/146.5, 146.1, 222/146.2, 256, 260, 333, 334, 386; 219/420, 421, 520, 521, 540

[56] References Cited

U.S. PATENT DOCUMENTS

| | | | |
|---|---|---|---|
| 3,982,669 | 9/1976 | Moore | 222/146 HE |
| 4,195,755 | 4/1980 | Slautterback et al. | 222/146 HE |
| 4,270,674 | 6/1981 | Moore | 222/146 HE |
| 4,344,547 | 8/1982 | Moore | 222/146 HE |
| 4,790,458 | 12/1988 | Moore | 222/386 |
| 4,899,910 | 2/1990 | Tabei et al. | 222/54 |

*Primary Examiner*—Kevin Shaver
*Assistant Examiner*—Keats Quinalty
*Attorney, Agent, or Firm*—Douglas B. Farrow

[57] ABSTRACT

A heated follower plate for use with drum end loaders has a number of concentric downwardly facing ribs which have heating elements located in the lower ends thereof. A plurality of radial passages are provided which alternate between those which extend fully from the circumference of the plate to the center with those which extend only partially inwardly. The bottom surface formed by the ribs is actually slightly convex in shape.

4 Claims, 5 Drawing Sheets

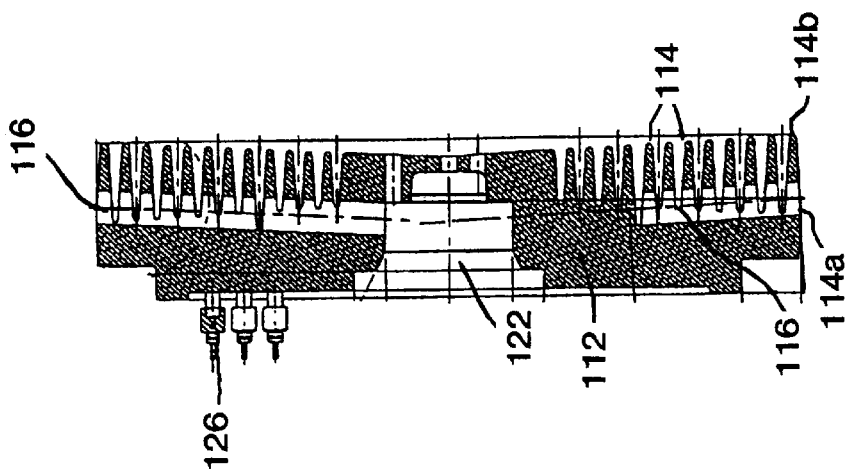
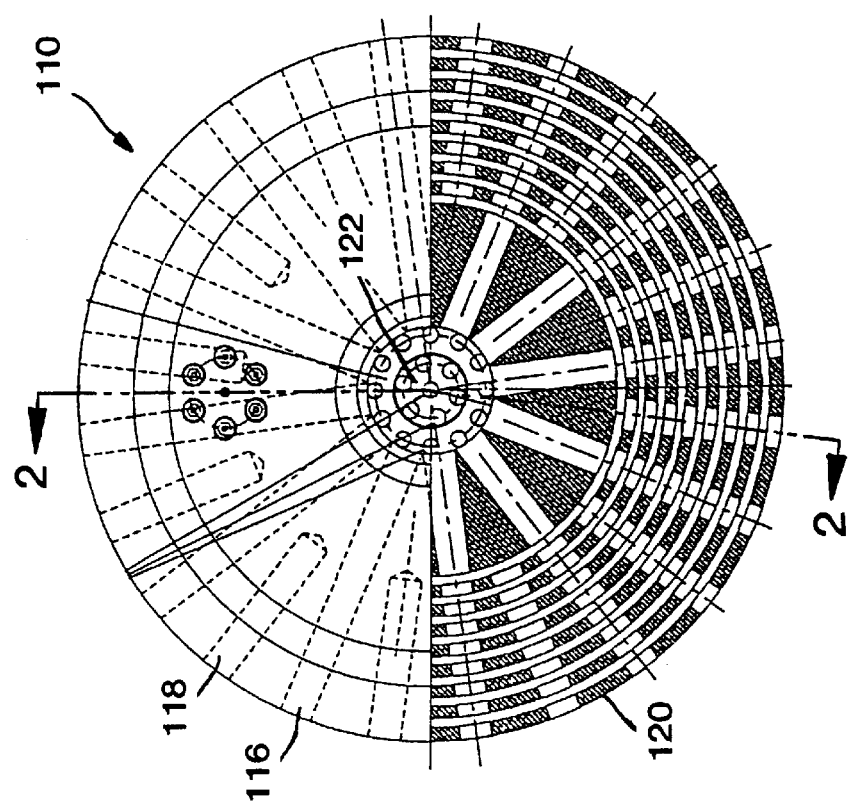
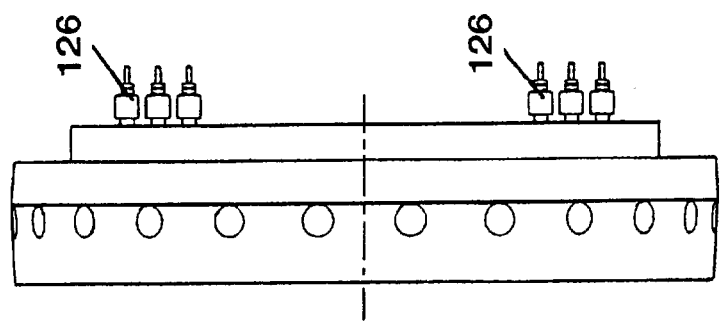

HEATED FOLLOWER PLATE

RELATED APPLICATIONS

This application is a continuation-in-part of U.S. application Ser. No. 60/058,829, filed Sep. 15, 1997.

BACKGROUND OF THE INVENTION

Follower plates for use in evacuating drums of hot melt adhesive and the like have been utilized for many years. Such devices typically incorporate a number of downwardly facing concentric ribs around a central aperture for evacuating the melted adhesive under the plate into a pump and thence to the point of application.

While such follower plates have been generally satisfactory, it is always desirable to have a more efficient use of the energy applied as well as to evacuate as much adhesive as possible out of the drum.

SUMMARY OF THE INVENTION

It is therefore an object of this invention to provide a follower plate which is easily and inexpensively manufactured and yet is extremely efficient in operation. It is further an object of this invention to provide a plate capable of evacuating as much adhesive as possible out of typical drums.

Typical follower plates have generally had a somewhat concave lower surface thereby providing in effect a chamber with which the central aperture may communicate. One problem with such a design is this typically leaves some portion of adhesive left in the drum as in many if not most cases the bottom drum surface is concave when viewed from above.

The instant invention is comprised of upper plate or body having a plurality of concentric ribs depending downwardly therefrom, each rib having a proximal end and a distal end. A plurality of radial passages run radially inwardly from the outer circumference of the follower plate. Full passages extend completely radially inwardly to a central evacuation point which is designed to be connected to a pump for transport to an application device. The full passages are interspersed with partially extending passages which generally alternate with the full set. The bottom surface formed by the distal ends of the ribs is slightly convex.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

FIG. 4 is a partially cutaway top view of the follower plate of an alternate embodiment of this invention.

FIG. 5 is a sectional view taken along line 2—2.

DESCRIPTION OF THE PREFERRED EMBODIMENT

Figure 1:
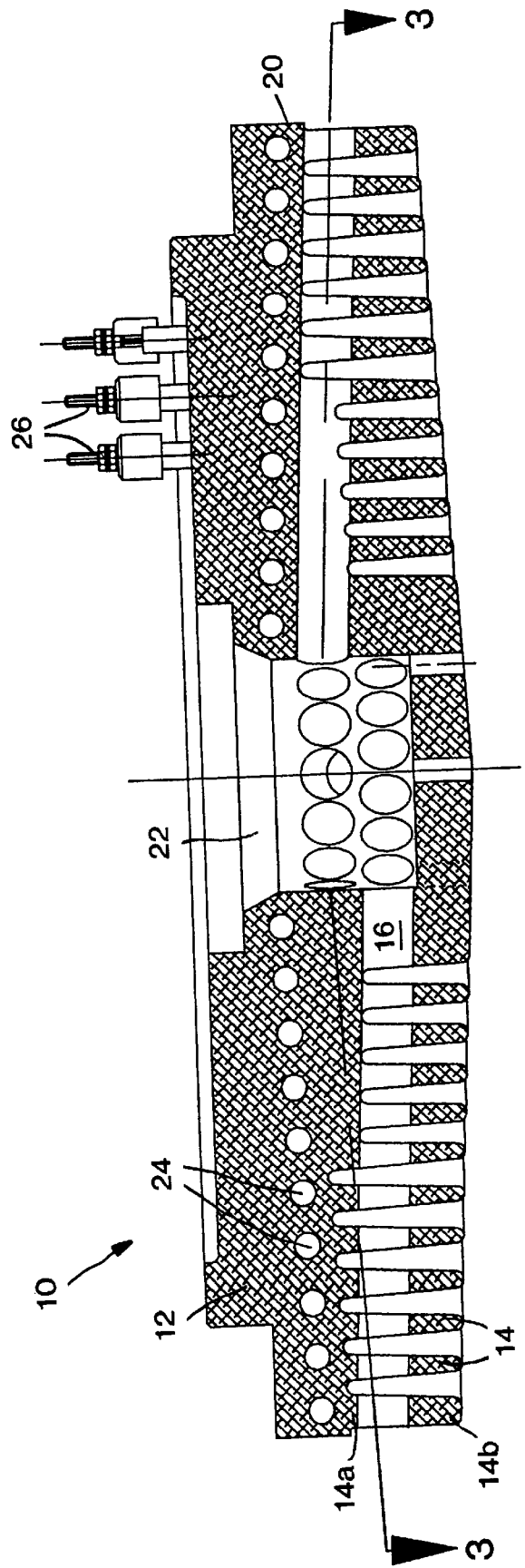
FIG. 1 is a sectional view taken along line 1—1 of FIG. 3 of the follower plate of this invention.
Figure 2A:
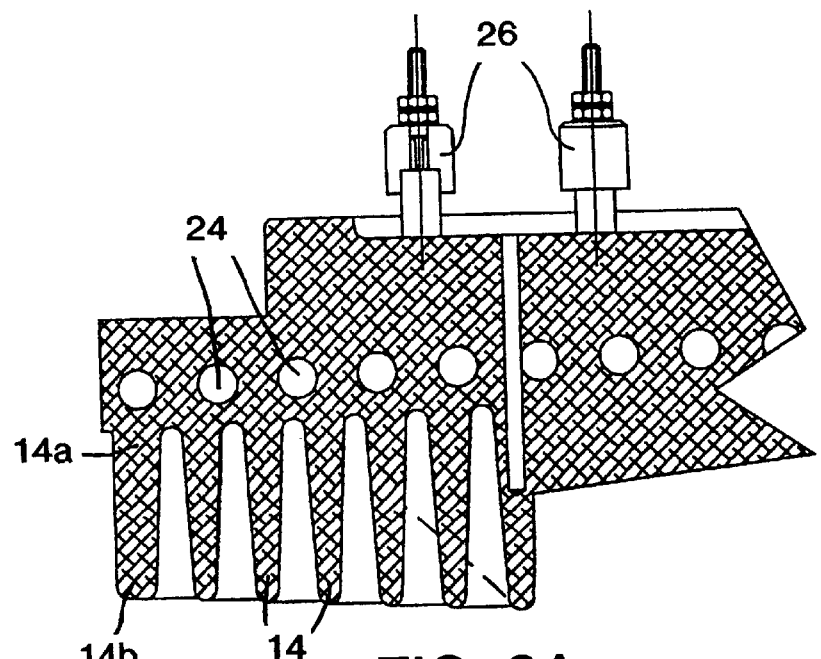
FIG. 2 is a sectional view taken along line 2—2 of FIG. 3.
Figure 2B:
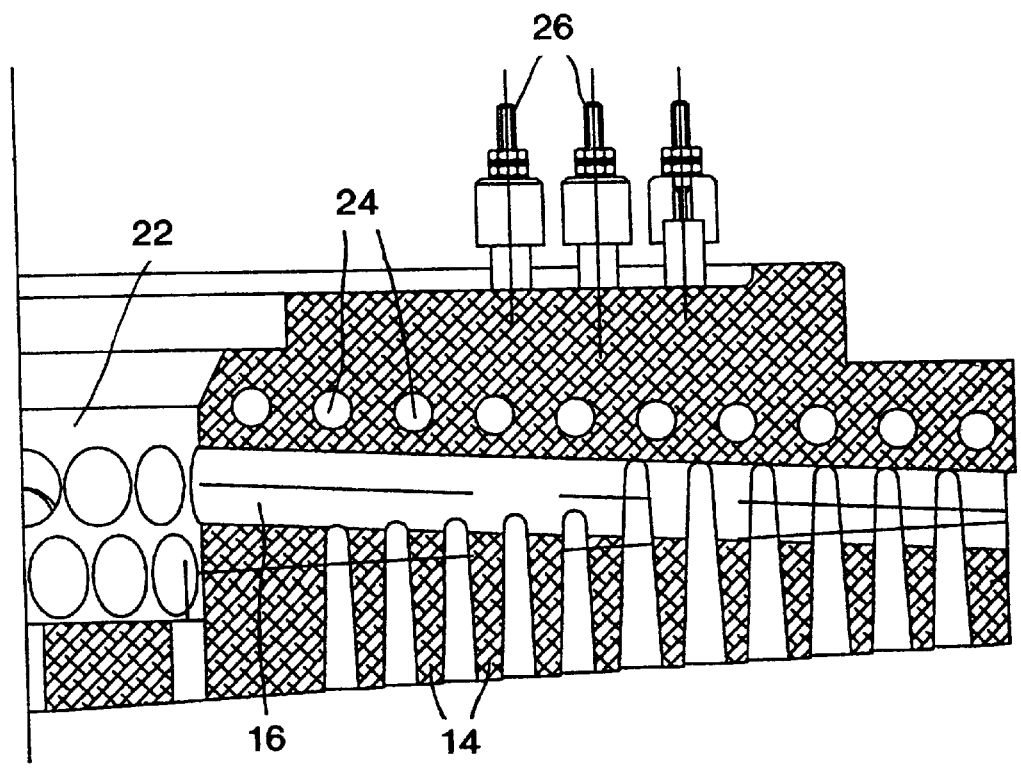

In general the instant invention generally designated 10 is comprised of upper plate 12 having a plurality of concentric ribs 14 depending downwardly therefrom, each rib 14 having a proximal end 14a and a distal end 14b. A plurality of radial passages 16 and 18 run radially inwardly from the outer circumference 20 of follower plate 10. Full passages 16 extend completely radially inwardly to central evacuation point 22 which is designed to be connected to a pump for transport to an application device. The full passages 16 are interspersed with partially extending passages 18 which generally alternate with full set 16.

Figure 3:
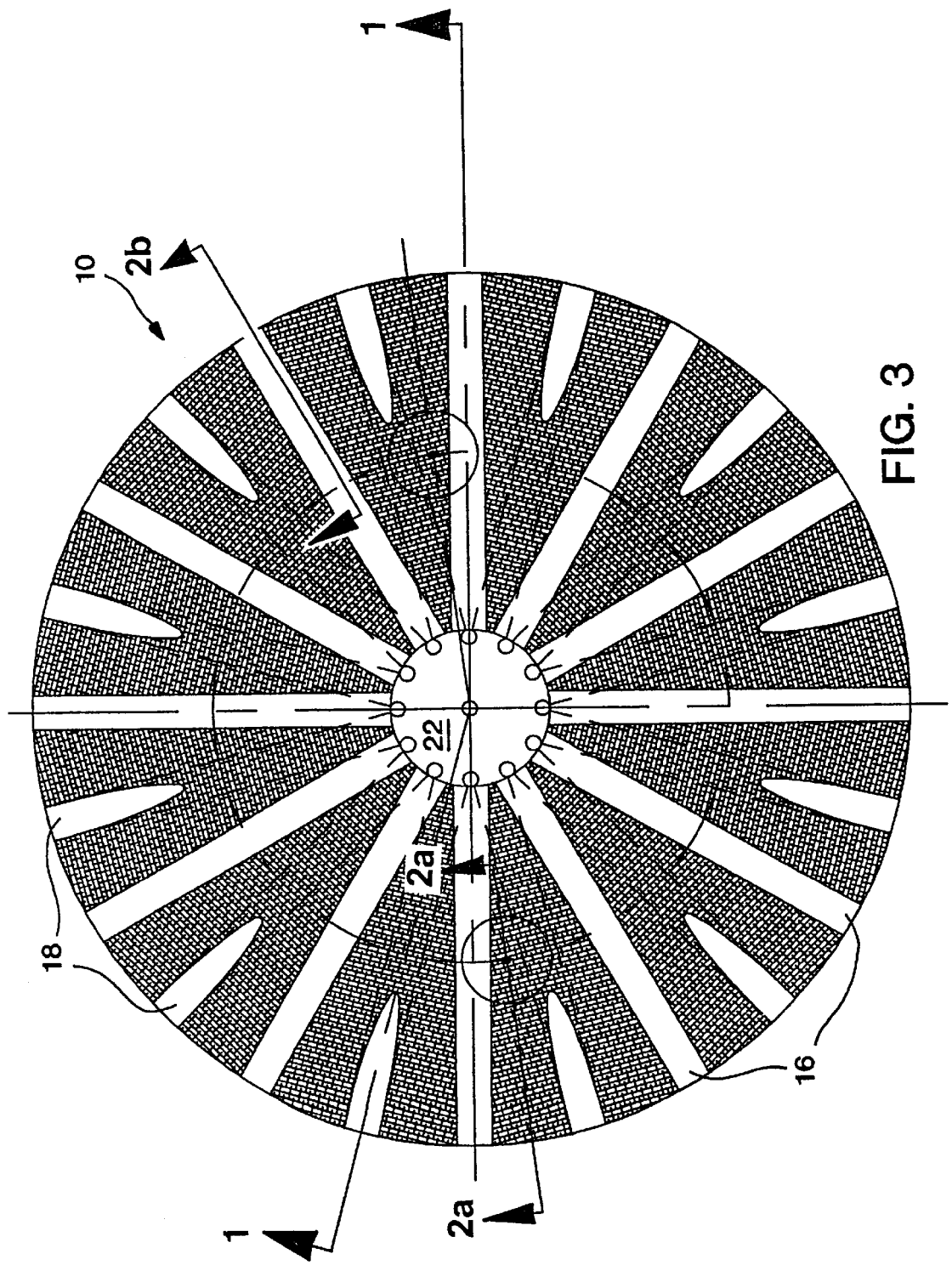
FIG. 3 is a sectional view taken along line 3—3 of FIG. 1.
Figure 6:
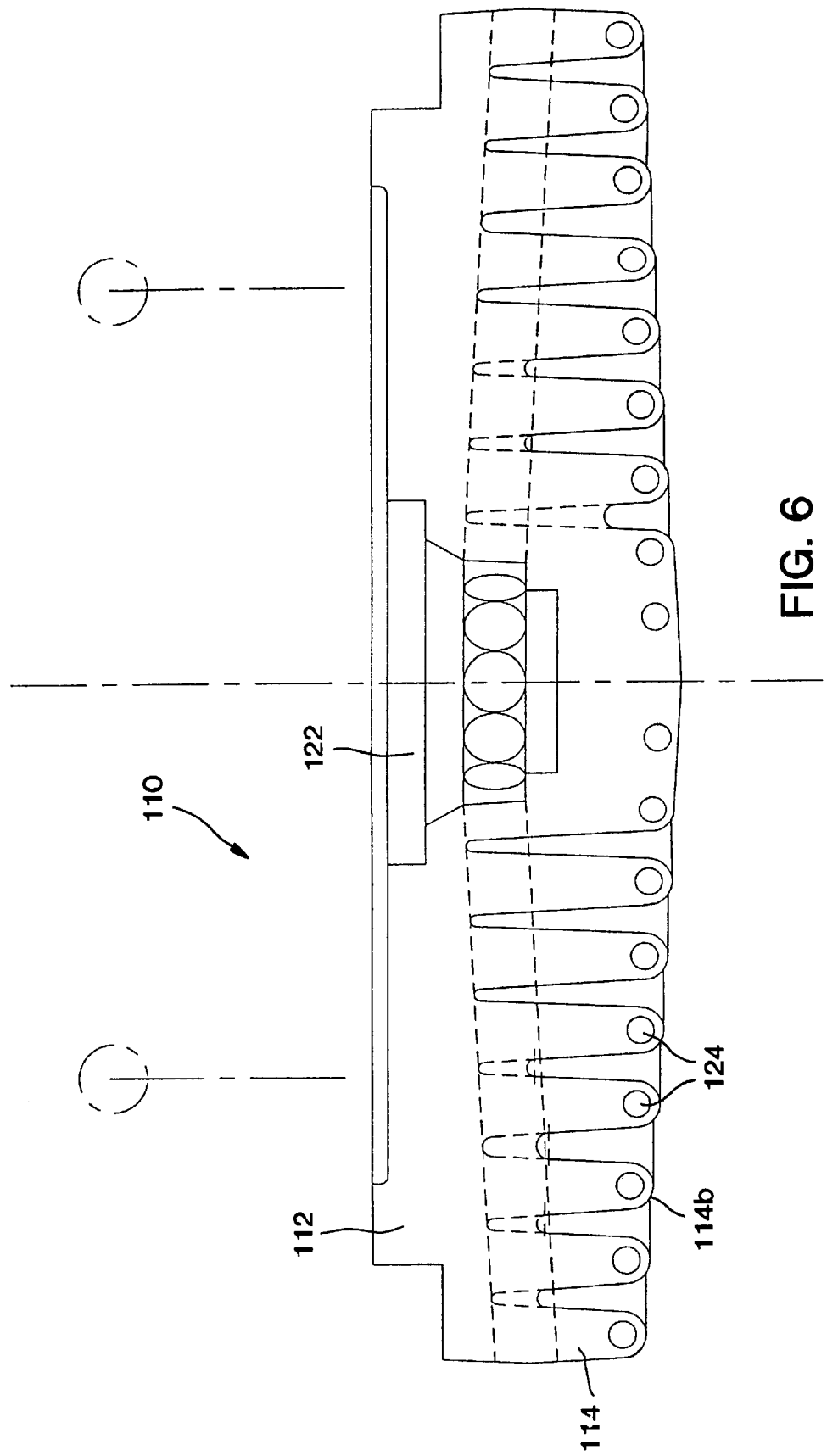
FIG. 6 is a cross-sectional view of an alternate embodiment of the instant invention.

As can be seen more particularly in FIGS. 1 and 3, heating elements 24 are located in the distal ends 14b of ribs 14 and extend circumferentially around the plate and ribs. Such location at the point of initial contact with the adhesive in the drum provides enhanced efficiency in terms of melting for a given amount of power to be applied. As can be seen in FIG. 3, the bottom surface formed by the distal ends 14b of ribs 14 is slightly convex and therefore provides maximum evacuation of the drum in which it will be used. Connectors 26 are used to energize heating elements 24. It can be appreciated that plate 10 may be formed by casting, machining or other conventional methods An alternate embodiment of the instant invention shown in FIGS. 4–6 is generally designated 110 is comprised of upper plate 112 having a plurality of concentric ribs 114 depending downwardly therefrom, each rib 114 having a proximal end 114a and a distal end 114b. A plurality of radial passages 116 and 118 run radially inwardly from the outer circumference 120 of follower plate 110. Full passages 116 extend completely radially inwardly to central evacuation point 122 which is designed to be connected to a pump for transport to an application device. The full passages 116 are interspersed with partially extending passages 118 which generally alternate with full set 116.

As can be seen more particularly in FIG. 6, heating elements 124 are located in the distal ends 114b of ribs 114 and extend circumferentially around the plate and ribs. Such location at the point of initial contact with the adhesive in the drum provides enhanced efficiency in terms of melting for a given amount of power to be applied. As can be seen in FIG. 6, the bottom surface formed by the distal ends 114b of ribs 114 is slightly convex and therefore provides maximum evacuation of the drum in which it will be used. Connectors 126 are used to energize heating elements 124. It can be appreciated that plate 110 may be formed by casting, machining or other conventional methods It is contemplated that various changes and modifications may be made to the follower plate without departing from the spirit and scope of the invention as defined by the following claims.

What is claimed is:

1. A heated follower plate for use with drum end loaders, said follower plate comprising:

a cylindrical body for attachment to a drum unloader;

a plurality of annular concentric ribs downwardly depending from said body, each said rib having a proximal end attached to said body and a distal end;

a central evacuation cavity at the center of said ribs and said body; and a plurality of radially extending passages extending inwardly through said ribs to said evacuation cavity.

2. The heated follower plate of claim 1 further comprising at least one heating element in said body.

3. The heated follower plate of claim 1 further comprising at least one heating element in at least one of said ribs.

4. The heated follower plate of claim 1 wherein the bottom surface formed by said distal ends of ribs is convex.

* * * * *